Dec. 23, 1952     H. E. ROWEN     2,622,870

SINTERING MACHINE

Filed Oct. 14, 1949     2 SHEETS—SHEET 1

INVENTOR.
HAROLD E. ROWEN
BY
ATTORNEY

Dec. 23, 1952     H. E. ROWEN     2,622,870
SINTERING MACHINE

Filed Oct. 14, 1949     2 SHEETS—SHEET 2

INVENTOR.
HAROLD E. ROWEN
BY
Benj. T. Rauber
ATTORNEY

Patented Dec. 23, 1952

2,622,870

UNITED STATES PATENT OFFICE 2,622,870

SINTERING MACHINE

Harold E. Rowen, Stanhope, N. J., assignor to Sintering Machinery Corporation, Netcong, N. J., a corporation of New Jersey Application October 14, 1949, Serial No. 121,258

4 Claims. (Cl. 266—21)

My present invention relates to a continuous sintering machine of the type in which the pallets which carry the grates pass in continuous succession over one or more wind boxes.

In sintering machines of the above type the pallets are guided by rails in an upper reach over the open upper ends of a wind box or wind boxes, then pass over a "dead plate" which seals the pallets to prevent passage of air. The pallets are then guided by curved parts of the rails to a lower reach extending below the wind boxes to the opposite end of the sintering machine, whereupon they are raised to the upper reach, loaded with the material to be sintered, and again pass over the wind boxes.

As the pallets pass from the upper reach and about the curved rails, they are inverted and their burden or load of sintered material is permitted to drop out of them. As each pallet passes onto and about the curved portions of the rails it slides by gravity through a short space and strikes the preceding pallet so as to jar or jolt the sintered material free from the pallet.

Heretofore the curved part of the guide rails, extending from the upper to the lower reach, has had a continuous curvature; i. e., the curvature of this part of the rails has had a constant radius. As a result, the pallets are not inverted until they pass a distance at least half way between the upper and lower rails and this lowers the point or level at which they discharge their contents, thus limiting the height of the receiving chute or hopper.

The pallets return from the delivery end of the sintering machine by gravity to the loading end at which they are lifted to the upper reach. The gravitational effect is most effective after the pallets reach the part of the curve which is tangential to the vertical and, accordingly, this effect is much lowered because of the small curvature of the guide rails.

My present invention provides a sintering machine having guide rails in which the inverting of the pallets is effected at a higher level and with a sharper turn and in which an increased and more regular gravitational effect is obtained.

In the present invention I provide a sintering machine in which the rails curve from the upper to the lower reach with a larger curvature, or short radius immediately adjacent the upper reach and then continue with a smaller curvature or larger radius to the lower reach. This causes the pallets to be inverted at a higher level and with a sharper turning movement to vertical position and then to continue downwardly from this higher level on a more gradual slope and with improved gravitational effects to the lower reach for return to the delivery end of the machine.

The various features of my invention are illustrated, by way of example, in the accompanying drawings in which—

Figure 1:
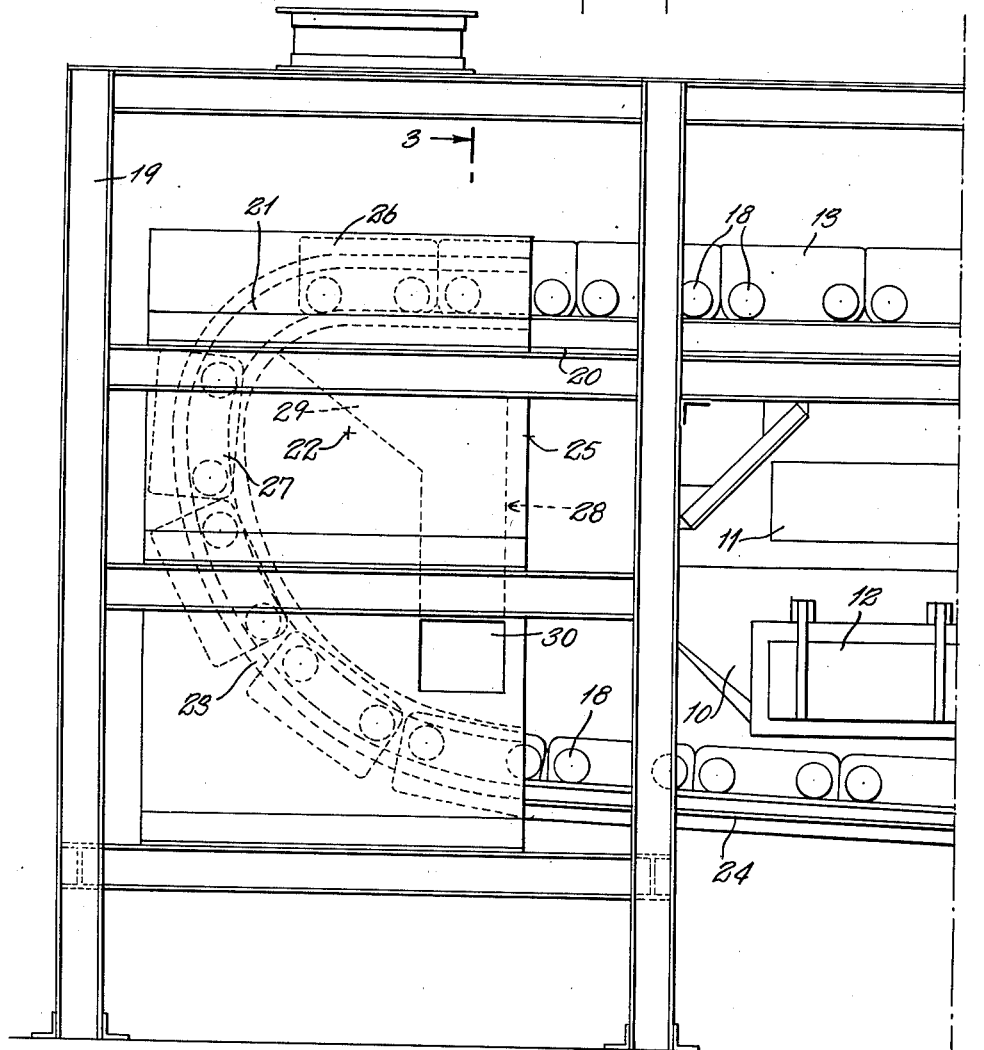
Fig. 1 is a side elevation of a part of a sintering machine embodying the invention near the delivery end thereof.

In the embodiment of the invention shown in the accompanying drawings, a sintering machine is provided with a number of wind boxes of which the end wind box 10 is located near the discharge end of the machine. These wind boxes may be provided with outlet openings or passages 11 through which air is withdrawn, and with suitable clean-out doors 12. A succession of pallets 13, which may be of any usual or suitable construction, pass over the wind boxes fitting tightly the upper open ends thereof so that air is drawn downwardly through the pallets to the wind boxes.

The pallets are guided in their passage over the wind box 10 by pairs of rails 14 and 15 at the sides of the wind box, each pair comprising an upper rail 16 and a lower rail 17 between which pass wheels 18. The rails 16 and 17 may be supported upon a framework indicated at 19.

After passing beyond the wind box 10 the pallets may be sealed by a "dead plate" positioned at 20, Fig. 1. After passing beyond the dead plate the rails 16 and 17 curve downwardly at 21. This part of the rails is curved in a relatively sharp or large curvature the radius being correspondingly short. For example in the embodiment shown in Fig. 1 the center of curvature of this part of the rails may be at the point 22. The same curvature extends approximately throughout a quarter turn, bringing the pallets to a substantially vertical position.

As the rails continue downwardly their curvature is lessened as at 23 and continue at this lesser curvature or greater radius until the curve joints the lower reach 24 of the rails. For example the curvature of the section 23 may be centered at the point indicated at 25, Fig. 1.

It will be apparent, therefore, that the pallets are brought to a vertical position and thereafter become inverted at the level of the points 22 and 25, whereas if the curve were constant or with a constant radius the point at which they reach a vertical position and begin to become inverted would be midway between the upper and lower reaches and, therefore, much lower. Moreover the sharpness of the upper quarter of the curve serves to bring the pallet from the horizontal to the vertical position much more quickly so that the rear or trailing end is quickly thrown forwardly as the leading edge drops. This rapid swinging throws the looser material on the top of the pallet forwardly, clear of the rails. The pallet then is in substantially vertical position as it drops into the lower more gradual curvature of the part 23 and strikes the preceding pallet with an impact distributed throughout the full areas of the colliding ends of these pallets, thus avoiding a chipping or cutting of this face that may occur with an edge to edge impact. The emptying of the pallets is, therefore, brought to a higher level as the material in the pallets is jarred loose when a pallet moves from the position indicated at 26 to that indicated at 27 through the short intervening space and strikes the next preceding pallet.

Moreover, there is a continual gravitational effect from the higher level of the points 22 and 25 at which the weight of the pallets is exerted downwardly on the return curve. This gravitational effect is also more regular and effective in returning the pallets along the lower reach of the guide rails to the loading end of the machine.

As each pallet breaks from its horizontal position on the upper reach into the curved portion 21 some of the material will spill. To prevent such spilling onto the inverted pallet a chute 28 is provided between the upper and lower reaches and having a widened hopper 29 to collect the spilled material and deliver it through the chute to sidewise delivery openings 30.

Figure 2:
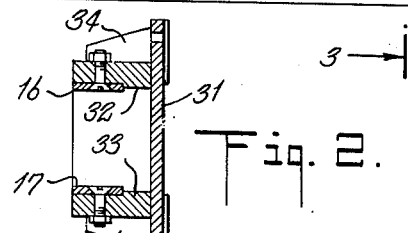
Fig. 2 is a detail sectional view showing the manner of mounting the guide rails.
Figure 3:
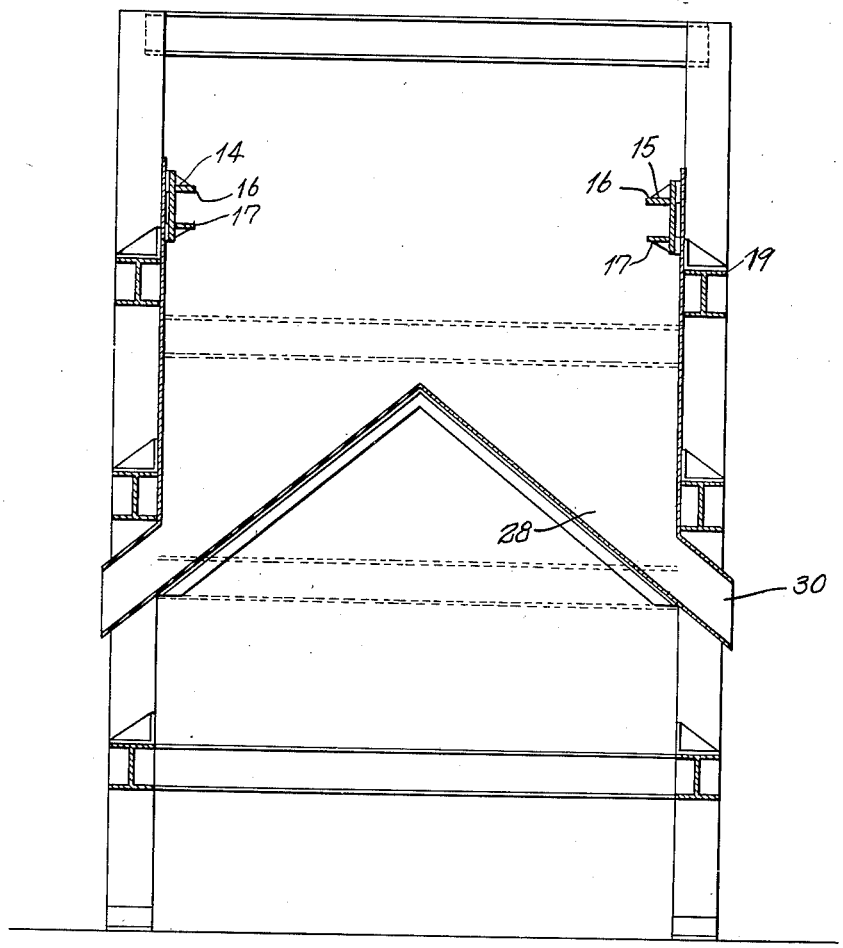
Fig. 3 is a vertical section of the sintering machine taken on line 3—3 of Fig. 1.

The guide rails may be of any suitable construction. As shown in detail in Fig. 2 they may comprise a supporting plate 31 having spaced sidewise extensions 32 and 33 on which the upper and lower rails 16 and 17 are securely bolted. The sidewise extensions may be braced at intervals by suitable brackets 34. The rails may be assembled of short lengths arranged and bolted end to end to from a continuous guide.

Through the above invention the return of the pallets to the delivery end is made more effective and the discharge of the sintered material takes place at a level at which it may be more conveniently collected and handled.

Having described my invention, what I claim is:

1. A stintering machine having pallet supporting guide rails at each side of said machine, said guide rails comprising an upper reach, a lower reach, and a connecting reach extending from said upper reach to said lower reach in a curve having a greater curvature through a quarter turn at its upper part adjacent the upper reach than at its lower part adjacent the lower reach.

2. A sintering machine having pallet supporting guide rails at each side of said machine, said guide rails comprising an upper reach, a lower reach, and a connecting reach extending from said upper reach to said lower reach in a curve, the radius of which is shorter through a quarter turn at its upper part adjacent the upper reach than at its lower part adjacent the lower reach.

3. A sintering machine having wind boxes and a dead plate, pallets passing in succession over said wind boxes and said dead plate, guide rails at each side of said machine guiding said pallets, said guide rails comprising an upper reach above said wind boxes, a lower reach below said wind boxes and a connecting reach extending from said upper reach to said lower reach in a curve, the radius of which is shorter through a quarter turn at its upper part adjacent the upper reach than at its lower part adjacent the lower reach.

4. The sintering machine of claim 3 having a hopper below the uppermost part of the connecting reach and the adjacent part of the upper reach and a chute extending from said hopper sidewise of said sintering machine.

HAROLD E. ROWEN.

REFERENCES CITED

The following references are of record in the file of this patent:

UNITED STATES PATENTS

| Number | Name | Date |
|---|---|---|
| 1,027,110 | Dwight | May 21, 1912 |
| 1,308,864 | Reckard | July 8, 1919 |
| 1,856,270 | Shallock | May 3, 1932 |
| 2,178,366 | Bruderlin | Oct. 31, 1939 |